United States Patent
Hartmann et al.

(10) Patent No.: US 8,329,826 B2
(45) Date of Patent: Dec. 11, 2012

(54) SURFACE MODIFICATION OF INTERPENETRATING POLYMER NETWORKS

(75) Inventors: Laura Hartmann, Berlin (DE); Stayce E. Beck, Menlo Park, CA (US); Jennifer R Cochran, Stanford, CA (US); Curtis W Frank, Cupertino, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 472 days.

(21) Appl. No.: 12/590,288

(22) Filed: Nov. 5, 2009

(65) Prior Publication Data
US 2010/0113708 A1 May 6, 2010

Related U.S. Application Data

(60) Provisional application No. 61/198,661, filed on Nov. 6, 2008.

(51) Int. Cl.
*C08F 8/14* (2006.01)
*C08F 8/32* (2006.01)

(52) U.S. Cl. .................. 525/329.9; 525/330.1; 525/379; 525/384

(58) Field of Classification Search ............... 525/329.9, 525/330.1, 379, 384
See application file for complete search history.

(56) References Cited

U.S. PATENT DOCUMENTS
2007/0179605 A1* 8/2007 Myung et al. ................ 623/5.16
* cited by examiner

*Primary Examiner* — Roberto Rabago
(74) *Attorney, Agent, or Firm* — Lumen Patent Firm

(57) ABSTRACT

Surface modification methods for an interpenetrating polymer network (IPN) hydrogel to provide a basis for cell or tissue attachment are provided. The method involves the activation of functional groups on the surface of the IPN hydrogel. The activated functional groups are then reacted with amine-containing molecules or hydroxyl-containing molecules. The methods (i) can be performed in an aqueous environment and do not require the use of any organic solvent, (ii) do not require UV treatment, thereby avoiding denaturation of the IPN hydrogel or proteins, and/or (iii) can be performed as a one pot reaction.

3 Claims, 7 Drawing Sheets

SURFACE MODIFICATION OF INTERPENETRATING POLYMER NETWORKS

CROSS-REFERENCE TO RELATED APPLICATIONS

This application claims priority from U.S. Provisional Patent Application 61/198,661 filed Nov. 6, 2008, which is incorporated herein by reference.

STATEMENT OF GOVERNMENT SPONSORED SUPPORT

This invention was made with Government support under contract R01EY016987 awarded by National Institutes of Health (NIH). The US Government has certain rights in the invention.

FIELD OF THE INVENTION

The present invention relates to surface modifications in interpenetrating polymer networks that can be used as a basis for cell or tissue attachment or growth.

BACKGROUND OF THE INVENTION

Diseases of the cornea are a significant source of blindness, affecting at least 10 million people worldwide. So far corneal transplant surgery using a human donor is the standard procedure to restore sight. However, due to the lack of donor corneas, especially in developing countries, and the risk of infection, the need for creating an artificial corneal implant has become more significant over the last decades.

Interpenetrating polymer network hydrogels (IPNs) are excellent candidates as an artificial corneal implant. Hydrogels have the ability to swell in water. High water content facilitates the diffusion of glucose, an important molecule that aids in the growth of a healthy layer of cells over the cornea. The material's ability to swell in water is related to its tensile strength. The optimal material would be stretchy, yet difficult to fracture. In addition, the combination of elasticity and durability increases the ease of suturing in a surgical procedure for implanting the artificial cornea.

To ensure that the hydrogel implant would provide a clear window for sight once implemented in an eye, unwanted protein deposits have to be prevented from building up a clouding layer of cell debris on the surface of the hydrogel. Although, for example PEG/PAA IPN hydrogels are resistant to non-specific protein absorption, some cellular growth on the hydrogels is necessary for example for healthy biological acceptance and to provide a barrier to bacterial infection. It has been demonstrated that cells will not grow on an engineered IPN hydrogel without surface modification. It is therefore desired to develop surface coupling techniques to make the hydrogel controllably attractive to cells. It is further desired to develop surface modification techniques that are efficient in process, preferably being a "one pot process", could be carried out in an aqueous environment and eliminate UV treatment (typically used for photo-crosslinking in prior methods), which could cause denaturation of the IPN hydrogel or proteins. The present invention addresses these needs.

SUMMARY OF THE INVENTION

The present invention provides new surface modification methods for an interpenetrating polymer network (IPN) hydrogel to provide a basis for cell or tissue attachment. The method involves the activation of functional groups on the surface of the IPN hydrogel. The activated functional groups are then reacted with amine-containing molecules or hydroxyl-containing molecules. The methods can be performed in an aqueous environment and do not require the use of any organic solvent. The methods also do not require UV treatment (which is typically used for photo-crosslinking in other methods), thereby avoiding denaturation of the IPN hydrogel or proteins. Furthermore, the methods can be performed as a one pot reaction.

In one example, a PEG/PAA based IPN hydrogel is used. The functional groups of this IPN hydrogel are the carboxylic groups of the PAA network, which once activated form ester groups and (i) subsequently form amide linkages when reacted with an amine containing molecules, or (ii) ester linkages when reacted with hydroxyl-containing molecules.

In another example, the functional groups are the carboxylic groups introduced by a bi-functional spacer into the PAA network of a PEG/PAA interpenetrating polymer network hydrogel, which once activated form ester groups and (i) subsequently form amide linkages when reacted with an amine containing molecules, or (ii) ester linkages when reacted with hydroxyl-containing molecules.

DETAILED DESCRIPTION

Figure 1:
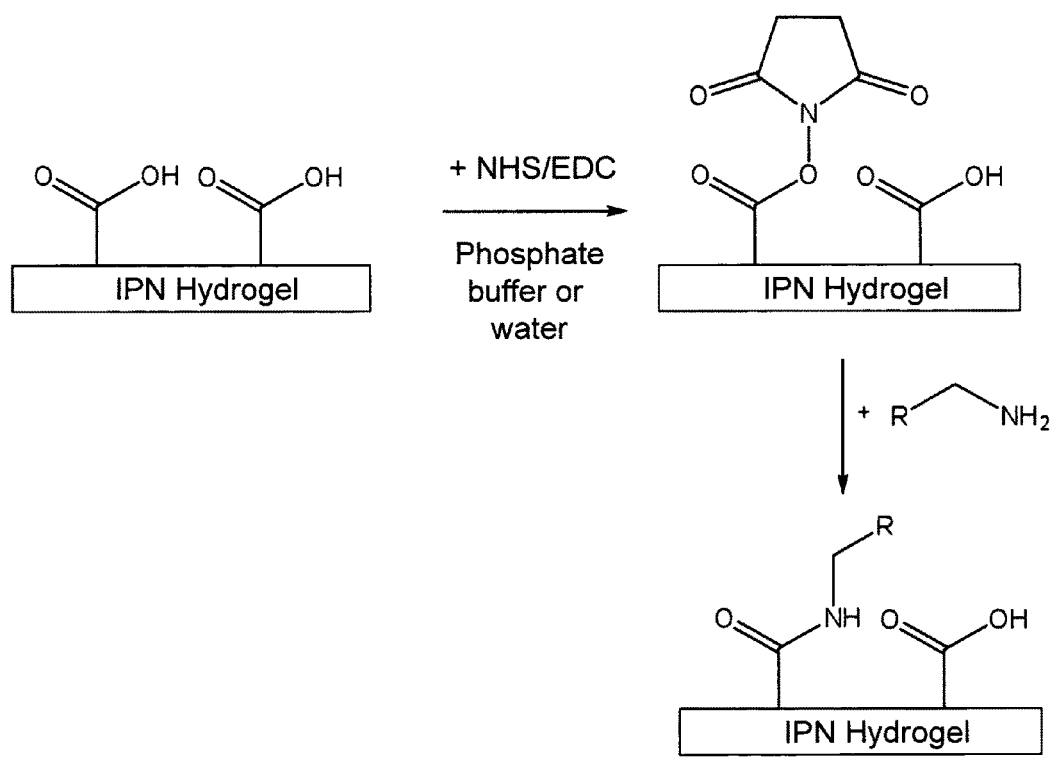
FIG. 1 shows an example according to the present invention of a surface activation reaction in aqueous media with N-hydroxysuccinimide and N-Ethyl-N'-(3-dimethylaminopropyl)carbodiimide followed by conjugation of biomolecules. R=protein, polypeptide, growth factor, amino acid, carbohydrate, phosphate-containing moiety, hormone, neurotransmitter or nucleic acid.

FIG. 1 shows an embodiment of the present invention to attain a different chemistry at the IPN hydrogel surface. This approach involves activating the functional groups on the surface of the hydrogel followed by a reaction of these activated functional groups with amine-containing or hydroxyl-containing molecules, macromolecules, or biomolecules. In a preferred embodiment, the carboxylic acid groups on poly(acrylic acid) within an IPN (e.g. a PEG/PAA based IPN) are activated to form an active ester, which subsequently forms acrylamide linkages when reacted with an amine-containing or ester linkages when reacted with hydroxyl-containing molecule, macromolecule, or biomolecule. For specific teaching of PEG/PAA-based IPN hydrogels, the reader is referred to U.S. Non-Provisional application Ser. No. 12/070,336 filed on Feb. 15, 2008, which is hereby incorporated by reference in its entirety.

In an example of this strategy, a PEG/PAA IPN hydrogel was surface modified with collagen type I. In comparison to the use of other crosslinker chemistry, this approach does not include the use of any organic solvent or UV treatment (typically used for photo-crosslinking in other methods) thus preventing the tethered protein from partial denaturation. The PEG/PAA IPN hydrogel was first sterilized by one cycle autoclaving in a PBS buffer and then washed with filter-sterilized PBS buffer. The PEG/PAA IPN hydrogel was then soaked in a solution of N-hydroxysuccinimide (255 mM) and N-Ethyl-N'-(3-dimethylaminopropyl)carbodiimide (45 mM) in PBS buffer pH 7.4 for one hour at 37° C. in the incubator. After rinsing the gel with PBS buffer, the surface of the gel was exposed to a 0.3% (w/v) collagen type I solution (Vitrogen) in PBS buffer and incubated overnight at 37° C. The hydrogel was then washed with PBS buffer until the pH equilibrated at pH 7.4.

Figure 2:
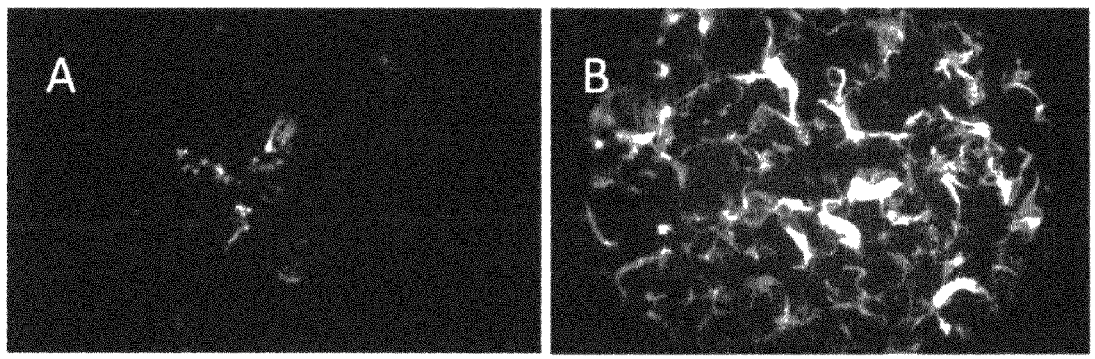
FIG. 2 shows an example according to the present invention of tethering of fluorescent-labeled collagen onto an IPN using EDC/NHS surface activation chemistry. A=Negative control, only non-specific adsorption. B=Covalent binding of Collagen.

FIG. 2 shows a qualitative analysis of the collagen tethering by using a fluorescent labeled collagen. Under the fluorescent microscope the tethered collagen appears light green (i.e. light grey or relatively lighter areas in the grey scaled image) while the hydrogel appears black (i.e. relatively darker compared to the tethered collagen areas). The negative control A of an untreated hydrogel shows only a few fluorescent regions that result from unspecific adsorption of protein on the gel. These proteins are not covalently linked to the gel and therefore will detach overtime e.g. through further PBS buffer washing steps. The surface modification using the EDC/NHS chemistry leads to the covalent linkage of collagen as shown by the fluorescent microscope images. An even surface tethering of collagen is indicated by the bright green regions (i.e. lighter areas in the grey scale image) of labeled collagen seen on the IPN hydrogel surface. This to protein layer cannot be washed off by excessive PBS buffer washing steps and is stable for a couple of weeks. Furthermore the NHS/EDC surface modification chemistry allows for a precise control over the amount of protein bound to the surface.

Figure 3:
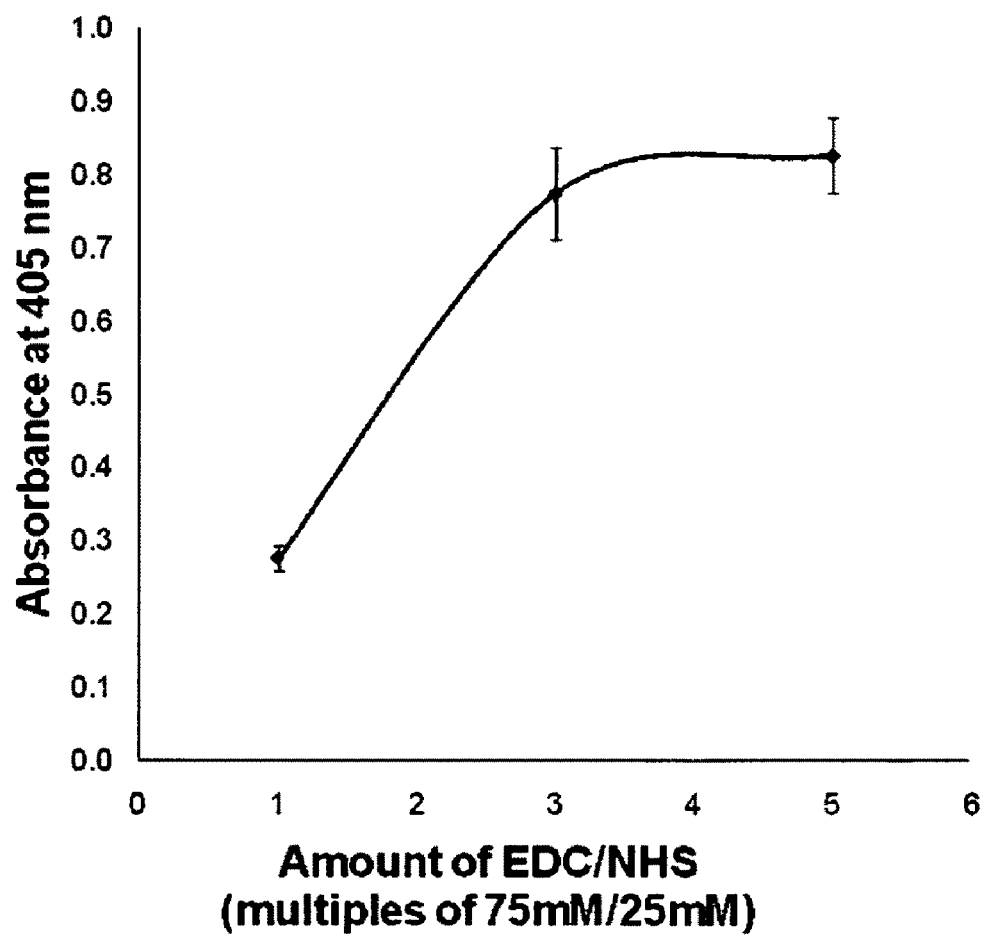
FIG. 3 shows an example according to the present invention of ELISA bioactivity of Type I collagen tethered to an IPN Surface (0.08 mg/mL collagen)
Figure 4:
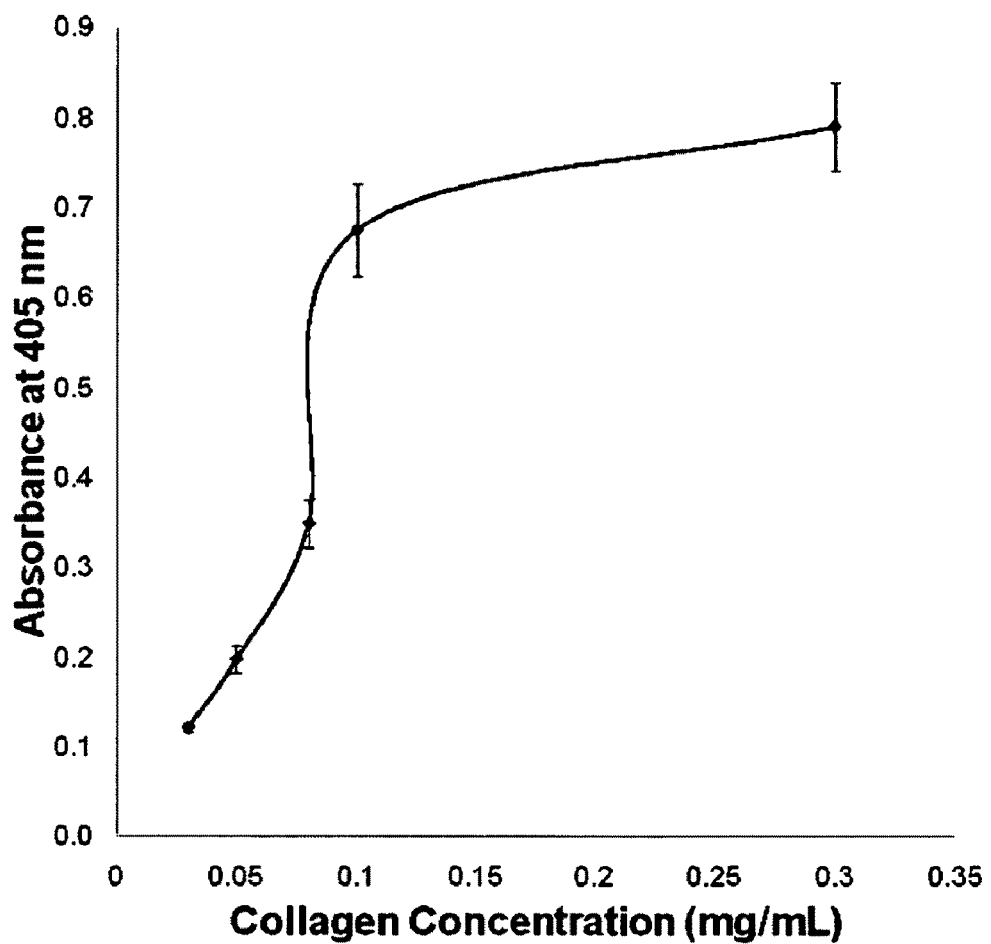
FIG. 4 shows an example according to the present invention of ELISA bioactivity of Type I collagen tethered to an IPN Surface (75 mM EDC/15 mM NHS).
Figure 5:
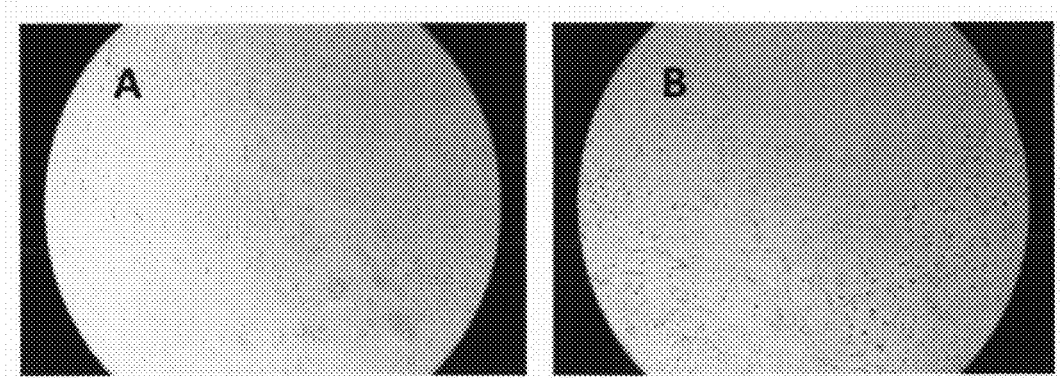
FIG. 5 shows an example according to the present invention of primary rabbit corneal fibroblast cells grown on an IPN tethered with collagen using NHS/EDC surface modification chemistry. A=Negative Control, no tethering of proteins. B=Tethering of Collagen.

ELISA assays using an antibody that specifically binds only to collagen in its natural confirmation give quantitative results on the tethering chemistry. FIG. 3 shows the dependence of collagen binding on the concentration of the EDC/NHS activation solution. Increasing amounts of activation reagent lead to an increase in the amount of tethered protein. FIG. 4 shows the ELISA results using different concentration of collagen during the tethering process. Again the use of higher concentrations results in a higher amount of covalently linked protein. The surface modified IPN hydrogels were then examined for their ability to promote cell growth and attachment. FIG. 5 shows primary rabbit corneal fibroblast cells that were cultivated on untreated (A) and collagen-tethered (B) hydrogels. Both hydrogels are non-toxic and biocompatible; therefore cells can grow in the presence of both hydrogels. On the untreated hydrogel the cells do not spread and attach on the hydrogel showing the cell repellent properties known for many different kinds of hydrogels. Only surface tethering of proteins such as collagen promotes the attachment of cells on the hydrogel. Attachment and spreading of the cells will then lead to the formation of a full cell layer on the hydrogel. This is particularly interesting for the use of the present device as an artificial cornea that requires the re-growth of the epithelium on top of the device itself in order to stabilize and integrate the implant.

These reactions can also be used to tether any molecule, macromolecule, or biomolecule with accessible amine or hydroxyl functional groups to the surface of carboxyl-group containing IPNs. The resulting surface-modification would then be used as the basis of a cell- or tissue-region attached to the present device.

PEG Spacer Synthesis

Figure 6:
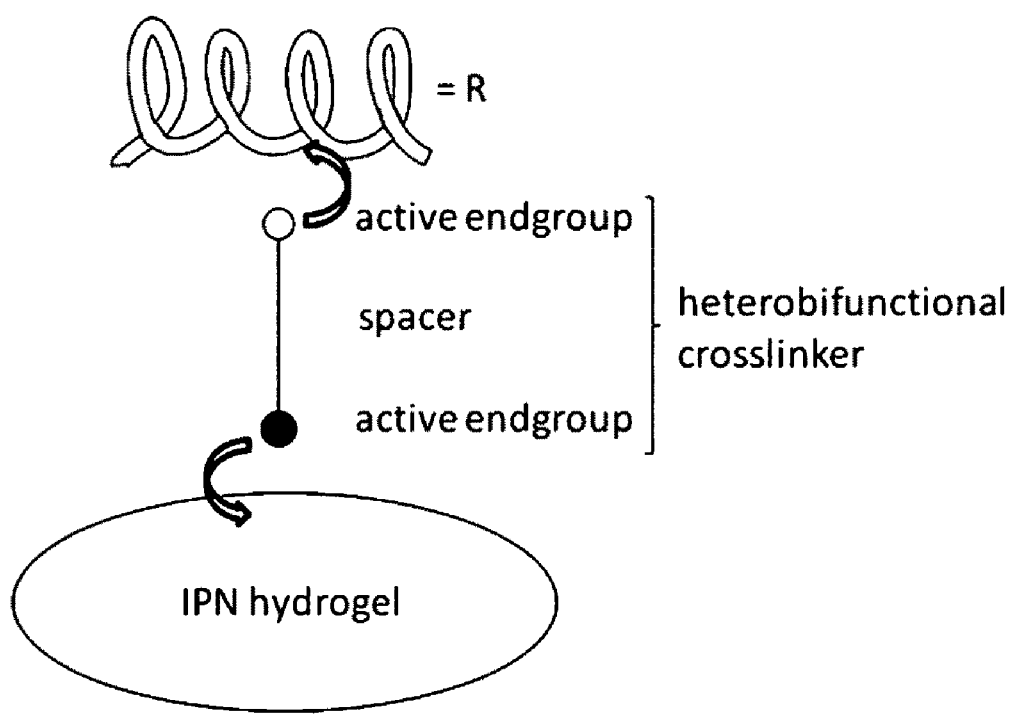
FIG. 6 shows an example according to the present invention of a heterobifunctional crosslinker with reactive end-groups and joined by a spacer arm to modify an IPN hydrogel surfaces. R=protein, polypeptide, growth factor, amino acid, carbohydrate, phosphate-containing moiety, hormone, neurotransmitter or nucleic acid.

FIG. 6 shows a heterobifunctional crosslinker with reactive endgroups and joined by a spacer arm to modify IPN hydrogel surfaces. Spacer arms can be varied in length (e.g. by changing PEG's molecular weight in a PEG spacer), which relates to the overall flexibility of protein(s) bound on the IPN hydrogel surface (e.g. distance and/or amount).

Figure 7:
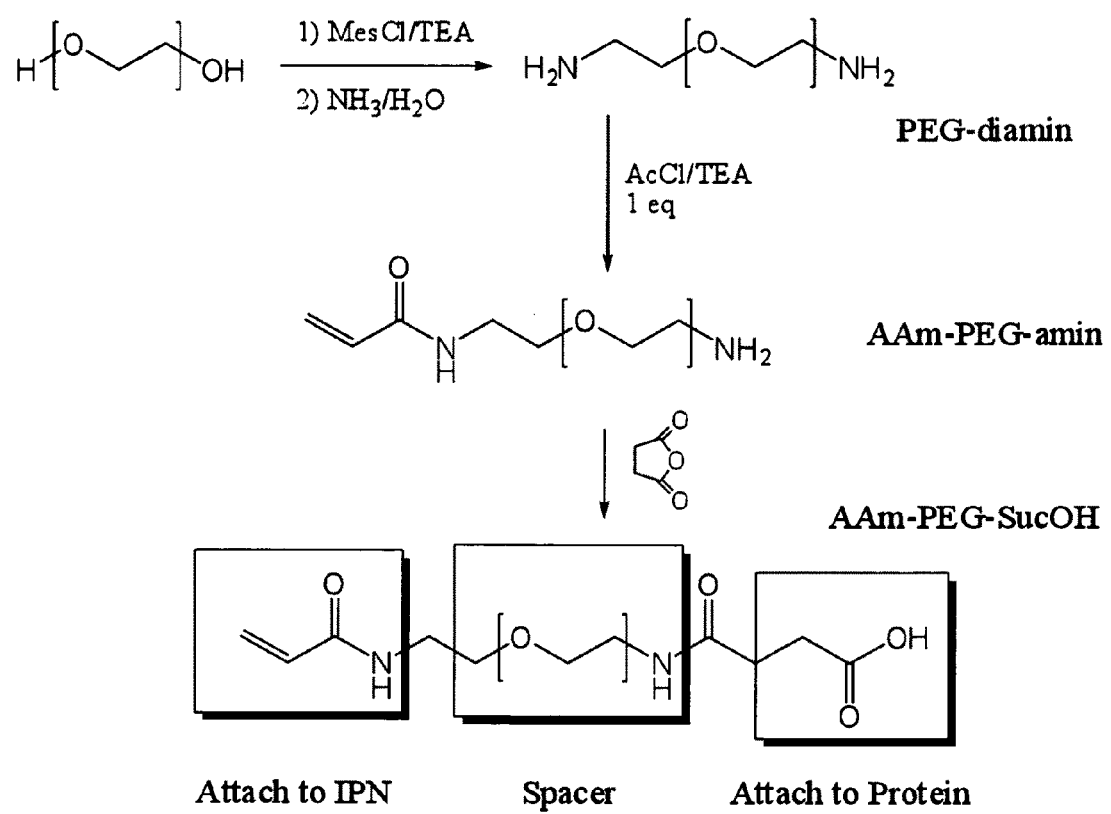
FIG. 7 shows an example according to the present invention of a heterobifunctional crosslinker synthesized from PEG (Poly(ethylene glycol)) allowing for binding to an IPN hydrogel surface and activation reaction in aqueous media to tether biomacromolecules such as proteins to the IPN hydrogel surface.

To attain a bifunctional PEG-spacer with a polymerizable acrylamide functionality on one side and a free carboxylic functionality on the other side, the following procedure is followed (FIG. 7). PEG mol. wt. 3400 (100 g, 58.8 mmol —OH) is azeotropically distilled in 700 mL toluene under nitrogen, removing about 300 mL of toluene. The toluene is then evaporated completely and then the PEG re-dissolved in anhydrous tetrahydrofuran. The triethylamine is distilled prior to use. The excess of mesylchloride is 3 eq per OH endgroup. The solution is cooled in a room temperature bath under Ar and then cooled in an ice bath. Anhydrous dichloromethane (Aldrich) is added until the solution becomes clear, about 100 mL. Triethylamine (24.6 mL, 176.5 mmol, Aldrich) is added dropwise with stirring, followed by the dropwise addition of 13.65 mmol mesyl chloride (176.5 mmol, Aldrich). The reaction proceeded overnight under argon. The solution was filtered through paper under vacuum until clear, followed by precipitation in diethyl ether. The product was collected by filtration and dried under vacuum. The PEG-dimesylate product was added to 400 mL 25% aqueous ammonia solution in a 1 L Nalgene bottle. The lid was tightly closed and sealed with Parafilm, and the reaction was vigorously stirred for 4 days at room temperature. The lid was then removed and the ammonia allowed to evaporate for 3 days. The pH of the solution was raised to 13 with 1 N NaOH, and the solution was extracted with 100 mL dichloromethane. For the extraction with dichloromethane, NaCl is added to the water-phase (~5 g) and the water-phase is extracted several times with 150 mL of dichloromethane. The dichloromethane washes were combined and concentrated in vacuo. The product was precipitated in diethyl ether, and dried under vacuum: PEG-diamine mol wt 3400 (20 g, 11.76 mmol amine) is then azeotropically distilled in 400 mL of toluene under argon, removing about 100 mL of toluene. The toluene is then evaporated completely and then the PEG re-dissolved in anhydrous tetrahydrofuran. The solution is cooled in a room temperature bath under Ar and then cooled in an ice bath. Anhydrous dichloromethane (Aldrich) is added until the solution become clear, Triethylamine (2.46 mL, 5.88 mmol, Aldrich) is added dropwise with stirring, followed by the dropwise addition of 0.72 mL of acryloyl chloride (5.88 mmol, Aldrich). The reaction proceeded overnight in the dark under argon. The solution is filtered through paper until clear, followed by precipitation in diethyl ether. The product is collected by filtration and dried under vacuum. The crude product is dissolved in ethanol. In an extra flask succinic anhydride (5.8 g, 58.8 mmol, Aldrich) is dissolved in ethanol by addition of triethylamine (24.6 mL, 176.4 mmol, Aldrich). The succinic anhydride solution is added to the polymer and stirred for 2 hours. After addition of NaOH (1M, 0.2 mL) the solution is stirred for another 20 min. The solvent is evaporated in vacuum and the product is then dissolved in 200 mL of deionized water, with 15 g of sodium chloride. The pH was adjusted to pH 6 with NaOH and extracted 3 times with 100 mL of dichloromethane (some product remains in the water phase as an emulsion). The dichloromethane washes were combined and the product was precipitated in diethyl ether, and dried under vacuum.

What is claimed is:

1. A surface modification method for an interpenetrating polymer network hydrogel, wherein said surface modification is capable of providing a basis for cell or tissue attachment to said surface modified interpenetrating polymer network, comprising:

a) activating functional groups on the surface of a PEG/PAA interpenetrating polymer network hydrogel, wherein said functional groups are the carboxylic groups as part of the PAA network of said PEG/PAA interpenetrating polymer network hydrogel; and b) reacting said activated functional groups with amine-containing molecules or hydroxyl-containing molecules, which once activated form ester groups and (i) subsequently form amide linkages when reacted with said amine containing molecules, or (ii) ester linkages when reacted with said hydroxyl-containing molecules, wherein steps 1(a) and 1(b) are performed in an aqueous environment and do not require UV treatment.

2. The method of claim 1, wherein the steps 1 of claim 1 do not require the use of any organic solvent.

3. The method of claim 1, wherein the steps of claim 1 are capable of being performed as a one pot reaction.

* * * * *